United States Patent
Blasio et al.

(10) Patent No.: US 7,139,094 B2
(45) Date of Patent: Nov. 21, 2006

(54) SYSTEMS AND METHODS FOR SIMPLIFIED SCANNING USING MULTI-FUNCTION DEVICES

(75) Inventors: Anthony J. Blasio, Penfield, NY (US); Ken Hayward, Brockport, NY (US); Marc J. Krolczyk, Rochester, NY (US); Debora M. Litwiller, Rochester, NY (US); Steven Peskor, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 973 days.

(21) Appl. No.: 09/749,564

(22) Filed: Dec. 28, 2000

(65) Prior Publication Data

US 2002/0085244 A1    Jul. 4, 2002

(51) Int. Cl.
    *G06K 1/00*      (2006.01)
(52) U.S. Cl. .................. 358/1.16; 358/1.15; 358/1.17; 382/318
(58) Field of Classification Search ............... 358/1.16, 358/1.15, 404, 444, 1.17; 382/318
See application file for complete search history.

(56) References Cited

U.S. PATENT DOCUMENTS

| | | | | |
|---|---|---|---|---|
| 5,459,579 | A * | 10/1995 | Hu et al. ..................... | 358/296 |
| 5,506,697 | A * | 4/1996 | Li et al. ...................... | 358/448 |
| 5,638,186 | A * | 6/1997 | Motoyama ................... | 358/448 |
| 5,682,540 | A * | 10/1997 | Klotz et al. ................. | 715/505 |
| 6,437,875 | B1 * | 8/2002 | Unno ......................... | 358/1.6 |
| 6,691,918 | B1 * | 2/2004 | Yoda et al. ................. | 235/454 |
| 6,734,994 | B1 * | 5/2004 | Omori ........................ | 358/474 |
| 6,931,432 | B1 * | 8/2005 | Yoshida ...................... | 709/206 |

OTHER PUBLICATIONS

"HP Officejet G Series All-in-One—HP Officejet G Series Front Panel Button Overview", http://www.hp.com/cgi-bin/cposupport/printerfriendly.cgi?in=multifunction/support_doc/bpu, first known published date Sep. 21, 2001.

(Continued)

*Primary Examiner*—Jerome Grant, II
*Assistant Examiner*—Houshang Safaipour
(74) *Attorney, Agent, or Firm*—Oliff & Berridge PLC

(57) ABSTRACT

A scanner is connected to a host computer. A scanner control routine is installed onto the host computer and used to generate and forward control signals to the scanner or multi-function device. Using the scanner control system, manager or routine, one or more scanned image destinations are defined and one or more scanning parameters are defined that are particularly appropriate for each such scanned image destination. Each scanned image destination is associated with one of a number of pre-named scanner destinations that can be selected using the scanner. These pre-named destinations usually have generic or otherwise meaningless names that are not associated with any particular destination or location. The user uses the control panel of the scanner or multi-function device to select one of the pre-named destinations. The scanner or multi-function device forwards this selected destination to the host computer. The scanner control system, manager or routine on the host computer converts the selected destination to the actual destination or location previously associated with that selected destination. The scanner control system, manager or routine then causes the host computer to "pull" a scanned image from the scanner or multi-function device based on the scanner parameters previously defined for the actual destination or location corresponding to the selected pre-named destination.

45 Claims, 7 Drawing Sheets

OTHER PUBLICATIONS

"HP Officejet G Series All-in-One—Using the Scan to Button", http://www.hp.com/cgi-bin/cposupport/printerfriendly.cgi?in=multifunction/support_doc/bpu, first known published date Sep. 21, 2001.

"HP Officejet G Series All-in-One—Macintosh Product Announcement Press Release", http://www.hp.com/cposupport/printers/support_doc/bpm30001.html, first known published date Apr. 11, 2001.

"How to Scan", http://www.homeandoffce.hp.com/hho/us/eng/technology_tips/all_in_one/officejct_g_series/how_to_scan.html, first known published date Apr. 5, 2001.

"Tips on Scanning", http://www.homeandoffice.hp.com/cgi-bin/printerfriendly.cgi?in=officejet_g_series/scanning.html, first known published date Apr. 5, 2001.

* cited by examiner

SYSTEMS AND METHODS FOR SIMPLIFIED SCANNING USING MULTI-FUNCTION DEVICES

BACKGROUND OF THE INVENTION

1. Field of Invention

This invention relates to scanning using scanners and multi-function devices that are connected to a host computer.

2. Description of Related Art

Currently, there are any number of conventional devices which can generate scanned images from original documents. These conventional devices include dedicated scanners and more complicated multi-function devices. These multi-function devices not only include scanning functions, but also include black and white and/or color printing functions, facsimile transmission and reception functions, and black and white and/or color copying functions.

Both dedicated scanners and multi-function devices are available in a large range of prices and functionalities. Generally, simple, lower-end scanners and multi-function devices are able to generate scanned images from original documents using a host computer that executes a scanning system, manager or routine that "pulls" the scanned image from the scanner by supplying all of the control signals to the scanner and performing one or more of the image processing functions at the host computer. In this case, the control system and the memory requirements for the lower-end scanner or multi-function device can be minimized. This allows the lower-end scanners and multi-function devices to be competitively priced.

In contrast, higher-end scanners and multi-function devices are able to scan images using control signals input directly at the control panel of the scanner or multi-function device. In this case, the higher-end scanner or multi-function device is able to "push" a scanned image to any selected destination selected from a variety of predefined destinations. In this case, the higher-end scanner or multi-function device does not need to rely on any of the memory or data processing capabilities of a host computer. Accordingly, in order to be able to "push" a scanned image directly to a selected destination, the higher-end scanner or multi-function device usually performs all of the image processing and image data storing functions locally. This requires a much more sophisticated control system and significantly larger amounts of memory be provided at the higher-end scanner or multi-function device.

SUMMARY OF THE INVENTION

However, because all of the functionality can be accessed by the user through the control panel of the higher-end scanner or multi-function device, is often easier for the user to accurately complete the desired scanning operation using a higher-end scanner or multi-function device than with the lower-end scanners or multi-function devices. This arises in part because of the more complicated software running on the host computer that the user must use to access the various functions of the scanning software to accomplish the same results. This also arises in part due to the less expensive, and thus less usable, user interfaces used in lower-end scanners or multi-function devices, and/or due to the more limited computational resources available for performing complicated operations in lower-end scanners or multi-function devices.

In particular, it would be highly desirable to be able to "effectively" push scanned images from a low-end scanner or a multi-function device having relatively limited local processing power and/or available memory.

This invention provides systems and methods that allow a user to select a destination at a control panel of a scanner or multi-function device that relies upon a host computer to pull a scanned image from that scanner or multi-function device.

This invention further provides systems and methods that allow the user to instruct the host computer that pulls the scanned image from the scanner or multi-function device where the scanned image is to be forwarded to.

This invention separately provides systems and methods that allow a user to assign meaningful names to the selectable destinations provided for selection at the control panel of a scanner or multi-function device that relies upon a host computer to pull a scanned image from that scanner or multi-function device.

This invention further provides systems and methods that allow a user to maintain the list of meaningful destination names on the host computer.

This invention additionally provides systems and methods that allow the user to pull the list of names from the host computer each time the user wishes to have an original document scanned by the scanner or multi-function device.

This invention separately provides systems and methods that allow a user to update or override, at the scanner or multi-function device, predefined, preselected or predetermined scanning parameters for a selected destination for a scanner or multi-function device that relies upon a host computer to pull a scanned image from that scanner or multi-function device.

This invention further provides systems and methods that allow a user to use various parameter-setting functions of a multi-function device to select the image scanning parameters used to override the predefined, preselected or predetermined image scanning parameters.

In various exemplary embodiments of the systems and methods according to this invention, a scanner or a multi-function device is connected to a host computer. A scanner control system, manager or routine is installed onto the host computer and used to generate and forward control signals to the scanner or multi-function device. In general, the scanner or multi-function device does not have sufficient processing power and/or available memory resources to be able to generate, process and forward, to the ultimate destination or location, a scanned image of an original document without interacting with the scanner control system, manager or routine.

In various exemplary embodiments of the systems and methods according to this invention, using the scanner control system, manager or routine, one or more scanned image destinations or locations are defined and one or more scanning parameters are defined that are particularly appropriate for each such scanned image destination or location. Each such scanned image destination is associated with one of a number of predetermined or pre-named scanner destinations that can be selected using a control panel of the scanner or multi-function device. In various exemplary embodiments, these pre-named destinations are given generic or otherwise meaningless names that are not associated with any particular destination or location.

In operation, the user uses the control panel of the scanner or multi-function device to select one of the pre-named destinations. The scanner or multi-function device forwards this selected destination to the host computer. The scanner control system, manager or routine on the host computer converts the selected destination to the actual destination or location previously associated with that selected destination. The scanner control system, manager or routine then causes the host computer to "pull" a scanned image from the scanner or multi-function device based on the scanner parameters previously defined for the actual destination or location corresponding to the selected pre-named destination.

In various exemplary embodiments of the systems and methods according to this invention, when the user generates a signal to the host computer that the user wants to use the scanner or multi-function device in a scanning mode, the host computer downloads a current set of meaningful destination names to the scanner or multi-function device. The scanner or multi-function device then displays this list of meaningful names to the user, so the user can more meaningfully select one of the destinations displayed using the control panel of the scanner or multi-function device. Thus, while the scanning operation occurs subsequently as described above, the user is able to more accurately and certainly select the proper destination to which the user wants the scanned image data to be forwarded to. Thus, the user does not have to either remember the association of each pre-named destination displayed on the control panel of the scanner or multi-function device with the actual destination that the host computer will forward the scanned image to.

In various exemplary embodiments of the systems and methods according to this invention, to the extent that the scanner or multi-function device has one or more control functions implemented in the control panel of that scanner or multi-function device, the user can use those control functions to select one or more scanning parameters to be used when generating the scanned image data from the original document. In this case, when the user forwards either a signal to the host computer to begin the scanning process, or when the user selects the destination for the scanned image data, either with the pre-named destinations or the meaningful destination names received from the host computer, these one or more selected scanning parameters are also forwarded to the host computer.

In response, when the scanner control system, manager or routine determines the scanning parameters to be used when generating the scanned image data from the original document, the scanner control system, manager or routine uses the user-supplied scanning parameters in place of any corresponding scanning parameters that were predefined, predetermined or preselected using the scanner control system, manager or routine. That is, the user-supplied scanning parameters supplied by the user from the control panel of the scanner or the multi-function device override any corresponding scanning parameters previously supplied using the scanner control system, manager or routine.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
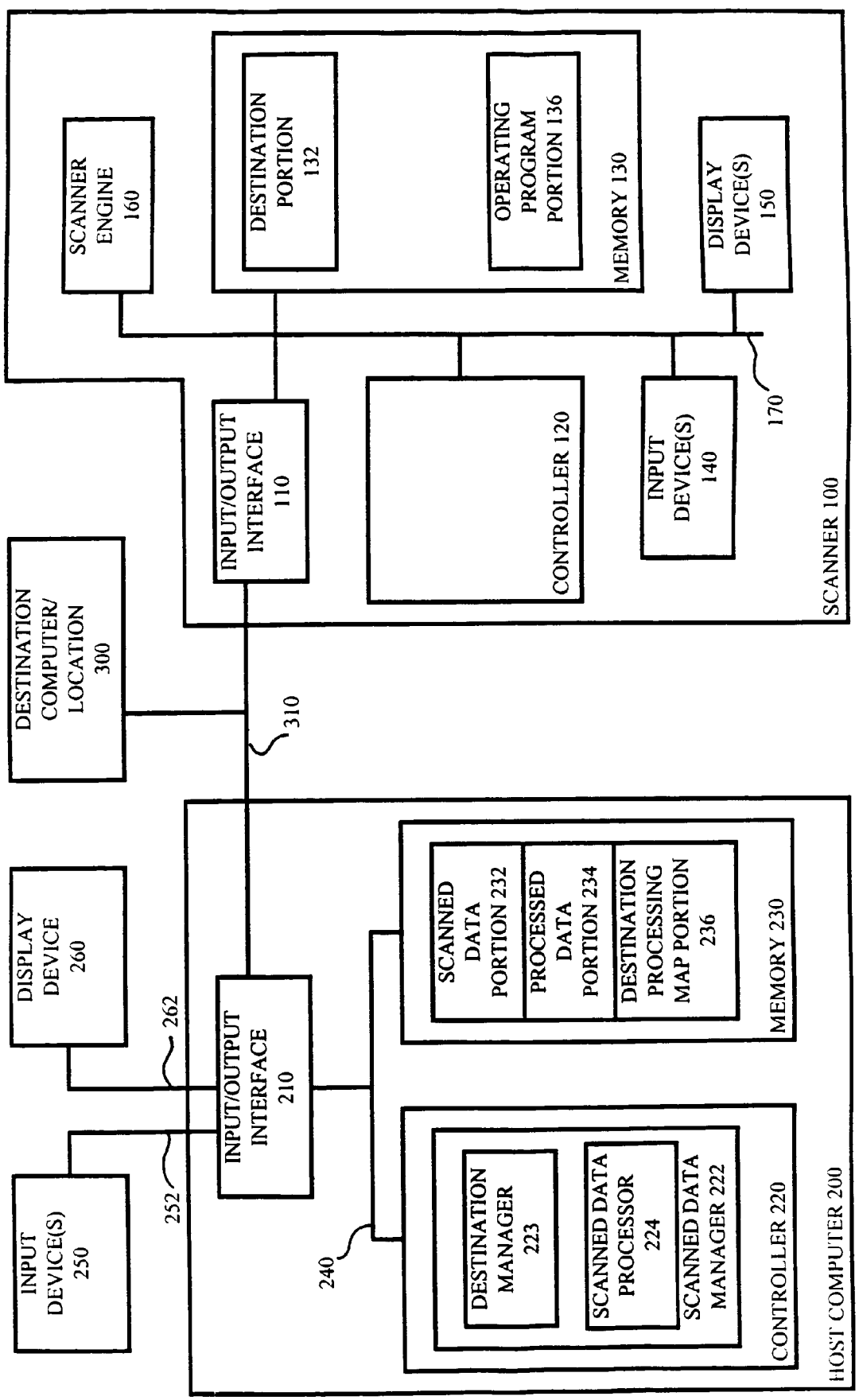
FIG. 1 is a block diagram of a first exemplary embodiment of a scanner or multi-function device and an associated scanner control system, manager or routine according to this invention.

FIG. 1 is a functional block diagram of a first exemplary embodiment of a scanner or multi-function device 100 according to this invention and a host computer 200 executing a scanner control system, manager or routine according to this invention. As shown in FIG. 1, the scanner or multi-function device 100 includes an input/output interface 110, a controller 120, a memory 130, one or more input devices 140 organized into a control panel, one or more display devices 150 organized as part of the control panel, and a scanner engine 160, interconnected by a control and/or data bus 170. The input/output interface 110 is connected by a link 310 to an input/output interface 210 of the host computer 200.

The host computer 200 also includes a controller 220 and a memory 230. One or more input devices 250 are connected by a link 252 to the input/output interface 210. Similarly, a display device 260 is connected by a link 262 to the input/output interface 210. The controller 220, the memory 230 and the input/output interface are connected by an internal data and/or control bus 240. Additionally, as shown in FIG. 1, one or more destination computers or locations 300 are also connected to the link 310.

The controller 220 includes at least a scanned data manager 222 that in turn includes at least a destination manager 223 and a scanned data processor 224. The memory 230 includes a scanned data portion 232, a processed data portion 234, and a destination processing map portion 236. The memory 130 of the scanner 100 includes at least a destination portion 132 and an operating system, manager or routine portion 136. In FIG. 1, each of the memory 130 and the memory 230 can be implemented using either or both of alterable or non-alterable memory. In FIG. 1, the alterable portions of the memory 130 or 230 are each, in various exemplary embodiments, implemented using static or dynamic RAM. However, the alterable portions of each of the memories 130 and 230 can also be implemented using a floppy disk and disk drive, a writable optical disk and disk drive, a hard drive, flash memory or the like. In FIG. 1, for each of the memory 130 and the memory 230, the non-alterable portions of the memories 130 and 230 are each,in various exemplary embodiments, implemented using ROM. However, the non-alterable portions can also be implemented using other non-volatile memory, such as PROM, EPROM, EEPROM, an optical ROM disk, such as a CD-ROM or a DVD-ROM, and disk drive, or other non-alterable memory, or the like.

Thus, for each of the memories 130 and 230, those memories 130 and 230 can each be implemented using any appropriate combination of alterable, volatile, or non-volatile memory or non-alterable or fixed memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

It should be appreciated that the controller 120 shown in FIG. 1 can be implemented as portions of a suitably system, manager or programmed general purpose computer. In this case, the operating system, manager or routine portion 136 of the memory 130 would store the operating system, manager or routines for such as suitably system, manager or programmed general purpose computer. Alternatively, the controller 120 can be implemented using an ASIC, a FPGA, a PEDL, a PLA, or a PAL, or using physically distinct hardware circuits, such as discrete logic elements or discrete circuit elements. The particular form the controller 120 shown in FIG. 1 will take is a design choice and will be obvious and predictable to those skilled in the art. Of course, if the controller 120 does not operate based on a stored program, the operating program portion 126 can be omitted.

As shown in FIG. 1, the scanned data manager 222 can include the destination manager 223 and the scanned data processor 224. In general, each of the scanned data manager 222, the destination manager 223 and the scanned data processor 224 will be implemented as software executing on a programmed general purpose computer, a special purpose computer, a microprocessor or the like. It should also be appreciated that the scanned data manager 222, the destination manager 223 and/or the scanned data processor 224 could also be implemented as a routine embedded in a scanner driver, as a resource residing on a network server, or the like. The scanned data manager 222, the destination manager 223 and the scanned data processor 224 can be implemented using any known or later-developed combinations of software, firmware and/or hardware that are suitable to implement the functionality set forth below. Thus, it should be understood that the controller 220 and the scanned data manager 222, the destination manager 223 and the scanned data processor 224 can each be implemented as portions of a suitably programmed general purpose computer.

In general, the one or more input devices 250 will include any one or more of a mouse, a track ball, a track pad, a touch screen, a microphone and associate voice recognition system software, a joy stick, a pen base system, or any other known or later-developed system for providing control and/or data signals to the host computer 200. Similarly, the display device 260 can be a CRT monitor, an LCD monitor, a plasma monitor or any known or later-developed device that is able to display a graphical user interface usable to provide graphic information to the user.

With respect to the input devices 140 and the display devices 150, these elements of the scanner or multi-function device 100 can be implemented using any known or later-developed devices that are appropriately incorporated into a control panel of a consumer electronic device. Thus, the input devices 140 can be any known or later-developed device, such as buttons, touch screens, touch pads, or the like. Similarly, each of the display devices 150 can be an LCD display, an LED display, or any other known or later-developed display device.

The link 310 can be any known or later-developed device or system for connecting the scanner or multi-function device 100 to the host computer 200, including a direct cable connection, a connection over a wide area network or a local area network, a connection over an intranet, a connection over the Internet, or a connection over any other known or later-developed distributed processing network or system. In general, the link 310 can be any known or later-developed connection system or structure usable to connect the scanner or multi-function device 100 to the host computer 200.

As shown in FIG. 1, the link 310 is also able to connect the host computer 200 to one or more destination computers or locations 300. In this case, the link 310 must also be able to support this connection. In other exemplary embodiments, the connection between the host computer 200 and the one or more destination computer or locations 300, to the extent any such destination computer or location 300 is remote from the host computer 200, can be implemented independently of the link 310 connecting the scanner or multi-function device 100 to the host computer 200. It should also be appreciated that one or more of the destination computers or locations 300 could be files and/or folders of the memory 230 of the host computer 200.

In operation, the user places a document to be scanned into the scanner engine 160 and operates one or more of the input devices 140 to display a desired predetermined destination on the display device 150. In general, this predetermined destination will have a generic destination name that is otherwise essentially meaningless to the user. The various predetermined destination names are stored in the destination portion 132. Upon the user pressing a start button of the input devices 140, the controller 120 accesses the particular destination stored in the destination portion 132 that has been selected by the user using the one or more input devices 140 and the one or more display devices 150 and controls the input/output interface 110 to supply that destination to the host computer 200 along with the indication that the host computer 200 is to begin pulling the scanned image data from the scanner or multi-function device 100 by generating control signals and outputting them to the scanner or multi-function device 100.

The input/output interface 210 of the host computer 200, under control of the controller 220, receives the control signals indicating that the host computer 200 is to begin pulling the scanned image data from the scanner or multi-function device 100, along with the indication of the selected destination selected by the user using the input devices 140 and the display devices 150 of the scanner or multi-function device 100. In response, the destination manager 223 of the scanned data manager 222 of the controller 220 accesses the destination processing map portion 236 stored in the memory 230. In particular, the destination manager 223 selects the actual destination and may select any pre-defined or pre-selected scanner parameters associated with that actual destination stored in the destination processing map portion 236 and provides those scanner parameters to the scanned data processor 224.

It should be appreciated that, prior to using the scanner or multi-function device 100 to generate the scanned image data, the user, or some other person, will have created the destination processing map portion 236 stored in the memory 230. That is, the user or the other person will have identified, for each generic destination name provided for the scanner or multi-function device 100 and stored in the destination portion 132, an actual destination to be used by the scanned data manager 222 when generating scanned image data upon the user selecting the corresponding generic destination name stored in the destination portion 132.

At the same time, the user or the other person can provide one or more scanner parameters to be used when generating the scanned image data when that actual destination is selected. In general, the user, or the other person, would have employed the destination manager 223 to specify the type of destination, such as, for example, an application, a folder, a remotely located computer, or the like, where the destination can be found, such as, for example, the destination's drive designation, network node, path, or the like. The user would also have employed the scanned data manager 222 to define the options for how to handle or process the scanned image data to be sent to this destination, such as for example, the resolution to be used, the image corrections to be applied, and the like.

Upon the destination manager 223 identifying the actual destination the scanned image data are to be forwarded to, and providing the predetermined or pre-selected scanner parameters for that destination to the scanned data processor 224, the scanned data manager 222 generates control signals which are output from the input/output interface 210 over the link 310 to the input/output interface 110 and ultimately over the data-control bus 170 to the scanner engine 160. The scanner engine 160 then generates the scanned image data from the original document and outputs them over the data-control bus 170, the input/output interface 110, and the link 310 to the input/output interface 210. The scanned data manager 222 then controls the input/output interface 210, the data-control bus 240 and the memory 230 to store the scanned data into the scanned data portion 232. The scanned data processor 224 then applies the desired image processing routines to the scanned data stored in the scanned data portion 232 to generate the processed image data, which are then stored in the processed data portion 234. The processed image data are then output under the control of the destination manager 223 through the input/output interface 210 and the link 310 to the destination computer or location 300, assuming that the designated destination is remote from the host computer 200. Otherwise, the destination manager 223 transfers the processed image data from the process data portion 234 into the appropriate folder or file on the memory 230 of the host computer 200.

It should be appreciated that, by using the scanner or multi-function device 100 to generate the indication of the destination of the scanned image data, and by having the destination map processing map portion 236 storing both the mapping between the generic destinations provided from the scanner or multi-function device 100 and the actual destinations desired by the user as well as the image processing to be applied to the scanned image data for that ultimate destination, the user no longer needs to go through potentially sophisticated scan programming interactions with the scanned data manager 222 every time that user wants to scan an image. Thus, assuming the destination processing map portion 236 has previously been set up, novice users can easily perform scans with a minimum of interaction with the scanned data manager 222.

Furthermore, if the host computer 200 is connected to one or more remote destination computers or location 300 over a distributed processing network used to implement the link 310, this architecture provides additional advantages. First, the destination processing map portion 236 can access destinations anywhere on the network that the operating system of the host computer can access over the distributed network implementing the link 310. Thus, other users on the distributed network can share access to the scanner or multi-function device 100 by making a file or folder on their local machine a destination identified in the destination processing map portion 236.

Additionally, because the user only needs to access the scanner or multi-function device 100 to identify the destination to which the user wants to have the scanned image data sent, is no longer necessary to directly access the scanned data manager 222 of the host computer 200. That is, because the host destination manager 223 can receive the signal from the scanner or multi-function device 100 indicating the desired generic destination, the scanned data manager 222 can obtain the scanned image data from the scanner or multi-function device 100 as a background process. Thus, a second user does not need to bother the owner of the host computer 200 in order to be able to generate scanned image data. Without the systems and methods according to this invention, the second owner would need to access the scanned data manager 222 using the host computer 200, interrupting the owner of the host computer 200. In contrast, using the systems and methods according to this invention, the user of the host computer 200 need never know that the host computer 200 has been used to obtain a scanned image data from the scanner or multi-function device 100 and forward that scanned image data to a remotely located destination computer location 300 over the distributed network implementing the link 310.

Figure 2:
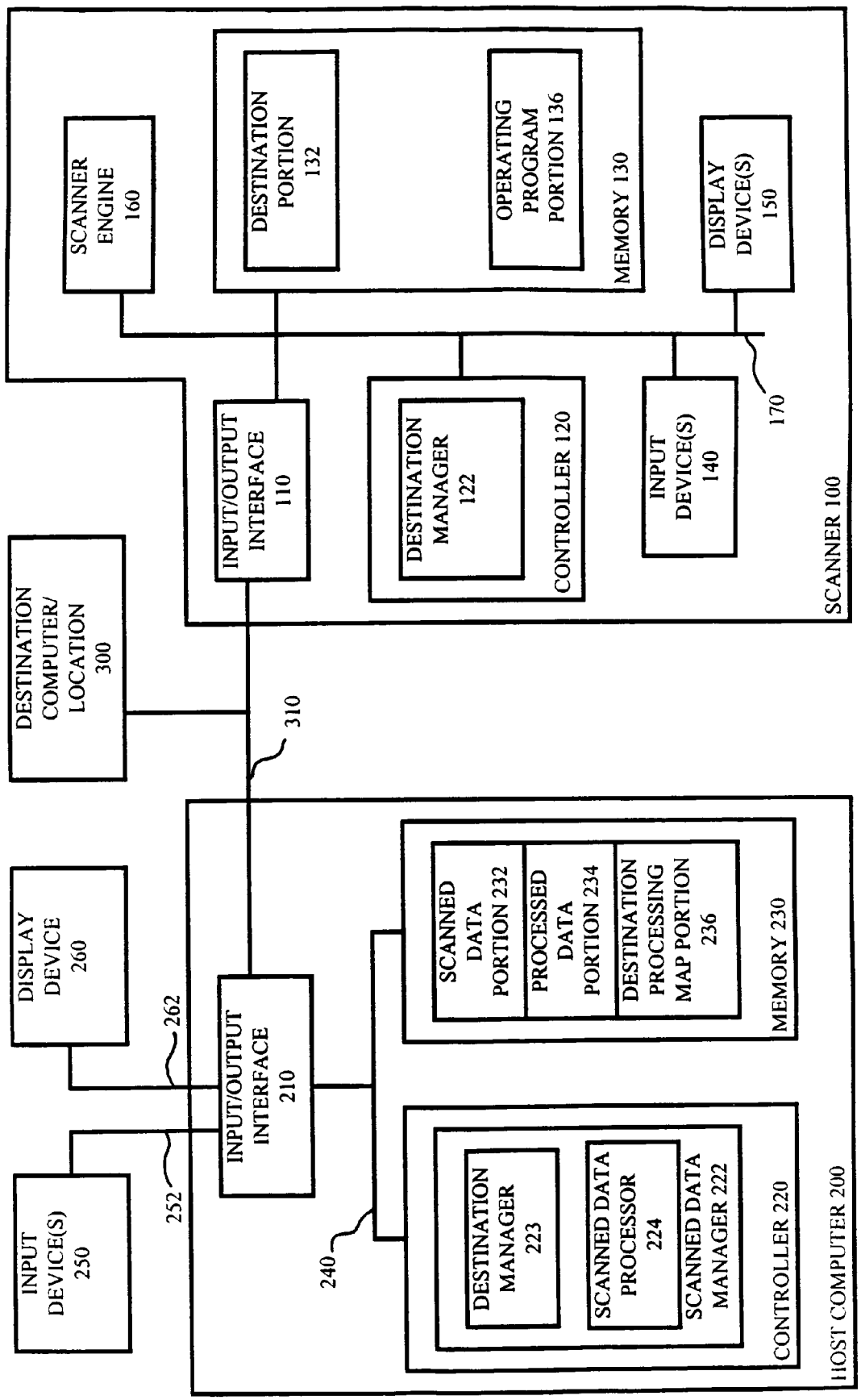
FIG. 2 is a functional block diagram of a second exemplary embodiment of a scanner or multi-function device and an associated scanner control system, manager or routine according to this invention.

FIG. 2 shows a functional block diagram of a second exemplary embodiment of the scanner or multi-function device 100 and the scanned data manager 222 according to this invention. In particular, it should be noted that, except as discussed below, the scanner or multi-function device 100 and the host computer 200 are essentially identical to the first exemplary embodiment of the scanner or multi-function device 100 and the host computer 200 outlined above with respect to FIG. 1. In particular, the second exemplary embodiment of the scanner or multi-function device 100 and the scanned data manager 222 shown in FIG. 2 differ from that shown in FIG. 1 only in that additional functionality is incorporated into the second exemplary embodiment of the scanner or multi-function device 100 and the scanned data manager shown in FIG. 2.

In particular, in the first exemplary embodiment outlined above with respect to FIG. 1, the destination portion 132 stores a list of generic destination names that have no particular meaning relative to any particular user. Thus, unless the user has used the scanner or multi-function device 100 sufficiently to have memorized the relationship between the generic destination names provided in the destination portion 132 and the actual destinations provided in the destination processing map portion 236, the user often has difficulty in determining which generic destination name should be selected to ensure the scanned image data goes to the user's desired destination computer or location 300. Ultimately, many users resolve this problem by creating a separate typed or handwritten list that indicates which generic destination name stored in the destination portion 132 corresponds to the actual desired destination computer or location 300. However, should any of the desired destination computers or locations 300 change, the user must, of course, create a new list.

In contrast, in the second exemplary embodiment of the scanner or multi-function device 100 and the scanned data manager 222 shown in FIG. 2, the controller 120 includes a destination manager 122. In operation, when the user places the scanner or multi-function device 100 into a scan mode, the destination manager 122 generates a control signal that is output through the input/output interface 110 and over the link 310 to the input/output interface 210 and the destination manager 223. In response, the destination manager 223 accesses the destination processing map portion 236 to obtain a list of meaningful destination names associated with the actual destination computers or locations 300 stored in the destination processing map portion 236. That is, when the various destinations stored in the destination processing map portion 236 were set up, rather than associating each such actual destination computer or location 300 with a generic, and otherwise meaningless, name, the destination processing map portion 236 also stores meaningful names that readily identify to the user the actual destination computer or location 300 that is associated with this meaningful destination name.

The destination manager 223 obtains these meaningful destination names and outputs them through the input/output interface 210 and over the link 310 to the input/output interface 110. These meaningful destination names received from the destination manager 223 are then stored in the destination portion 132 under control of the destination manager 122. Thus, when the user accesses the input devices 140 and the display devices 150 to scroll through the destination names to select a particular destination name to be sent to the scanned data manager 222, the user is given a series of meaningful names such that the user should be able to readily identify the ultimate destination computer or location 300 associated with each such meaningful name.

Additionally, these meaningful names are stored in the destination processing map portion 236, as destination computers or locations 300 are added to or removed from the set of destination computers or locations 300 stored in the destination processing map portion 236. Thus, the destination names provided by the display device 150 to the user are always current and accurate.

Thus, for example, a user could create a destination processing map portion 236 that associates a word processing folder 300 with the name "word processor" and a destination of a folder 300 for a photo processing system, manager or routine with the name "photo processor". When the user places the scanner or multi-function device 100 into the scanner mode, the destination names displayed in response thus include the destinations "word processor" and "photo processor", rather than two meaningless generic names. Thus, without any further thought, the user can readily select the appropriate destination for the document to be scanned.

Figure 3:
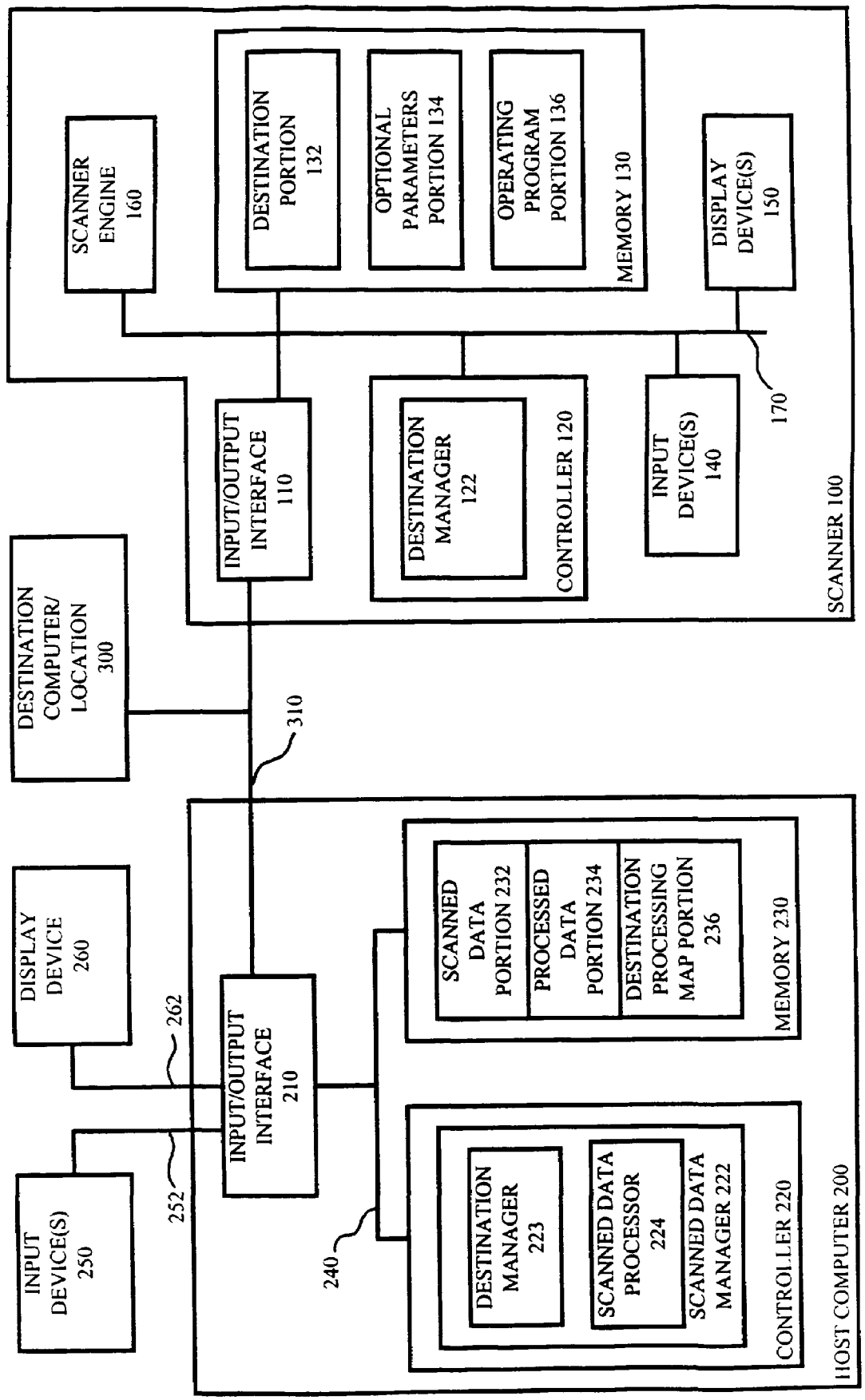
FIG. 3 is a functional block diagram outlining a third exemplary embodiment of a scanner or multi-function device and an associated scanner control system, manager or routine according to this invention.

FIG. 3 is a functional block diagram showing a third exemplary embodiment of the scanner or multi-function device 100 according to this invention and the scanned data manager 222 according to this invention. As in FIG. 2, the third exemplary embodiment, relative to the first and second exemplary embodiments, shown in FIGS. 1 and 2 merely adds additional functionality. Thus, the third exemplary embodiment outlined with respect to FIG. 3 can be used with either of the first or second exemplary embodiments outlined with respect to FIGS. 1 and 2. Thus, the third exemplary embodiment of the scanner or multi-function device and the scanned data manager 222, except as discussed below, is identical to the first and second embodiments described above and will not be discussed.

In the first and second exemplary embodiments outlined above, once the user, or some other person, has created the destination name-to-actual description location mapping stored in the destination processing map portion 236, along with the particular scanner parameters to be used for each different actual destination, every time that destination is selected, either using the generic name or a meaningful name, the scanned image data generated by the scanner engine 160 is processed identically.

However, many scanners and/or multi-function devices 100 have at least a limited ability to allow the user to select any one or more of various scanner parameters, such as resolution, color, original document type, brightness, contrast, scale, facsimile transmission resolution, automatic cropping, original substrate type, gamma, compression type and parameters, and any other known or later-developed scanner parameter. Accordingly, in this third exemplary embodiment, the memory 130 includes an optional parameters portion 134. In operation, when the user uses the input devices 140 and the display devices 150 to select either a generic name or a meaningful name from those stored in the destination portion 132, the user can also use any additional functionalities provided by the input devices 140 and the display devices 150 of the control panel of the scanner or multi-function device 100 to select specific scanning parameters the user wishes to use when scanning an original document. Those selected scanning parameters will be stored in the optional parameters portion 134.

Thus, when the user presses the start button, the destination manager 122 accesses the selected destination name stored in the destination/ portion 132 and forwards it through the input/output interface and over the link 310 to the input/output interface 210. Additionally, along with this destination name, the destination manager 122 accesses any additional or optional scanning parameters that may have been stored by the user into the optional parameters portion 134. The destination manager 122 transmits any such optional or additional scanning parameters stored in the optional parameters portion 134 along with the selected destination name through the input/output interface 110 and over the link 310 to the input/output interface 210.

The destination manager 223 accesses these data and uses them to select the particular actual destination computer or location 300 corresponding to the selected destination name provided from the scanner or multi-function device 110. At the same time, the scanned data processor 224 sets any received optional or additional parameters from the scanner or multi-function device 100 to be used when generating the scanned image data. The scanned data processor 224 then accesses the destination processing map portion 236 to obtain the set of previously defined scanner parameters to be used with the selected destination computer or location 300. However, the scanned data processor 224 overrides any previously defined scanner parameter if a corresponding additional or optional scanning parameter has been received from the scanner or multi-function device 100. Thus, the scanned data manager 222 generates control signals to the scanner engine 160 based first on any additional or optional scanning parameters received from the scanner or multi-function device 100, and then, to the extent that such additional or optional scanning parameters have not been received, relies on the previously-defined scanning parameters stored in the destination processing map portion 236 for the selected destination computer or location 300.

This provides a significant increase in the flexibility and productivity of the third exemplary embodiment of the scanner or multi-function device 100, in that it allows the user to make any number of adjustments to the previously defined scanning parameters stored in the destination processing map portion 236 using the control panel of the scanner or the multi-function device 100. Thus, the user does not have to navigate through the scanner control system, manager or routine to make these adjustments and/or adjust the image from a scanning. Accordingly, the user's knowledge of the various scanner parameter options provided at the scanner or multi-function device 100 can be leveraged advantageously. These features are accessed using buttons and/or menu items. Thus, by allowing the limited set of relevant features, such as color, resolution, original document type, and the like, that have been implemented on the control panel of the scanner or multi-function device user interface, to append or override the previously defined scanner parameters stored in the destination processing map portion 236, significantly greater flexibility is provided to the user to control the scanning process.

Figure 4:
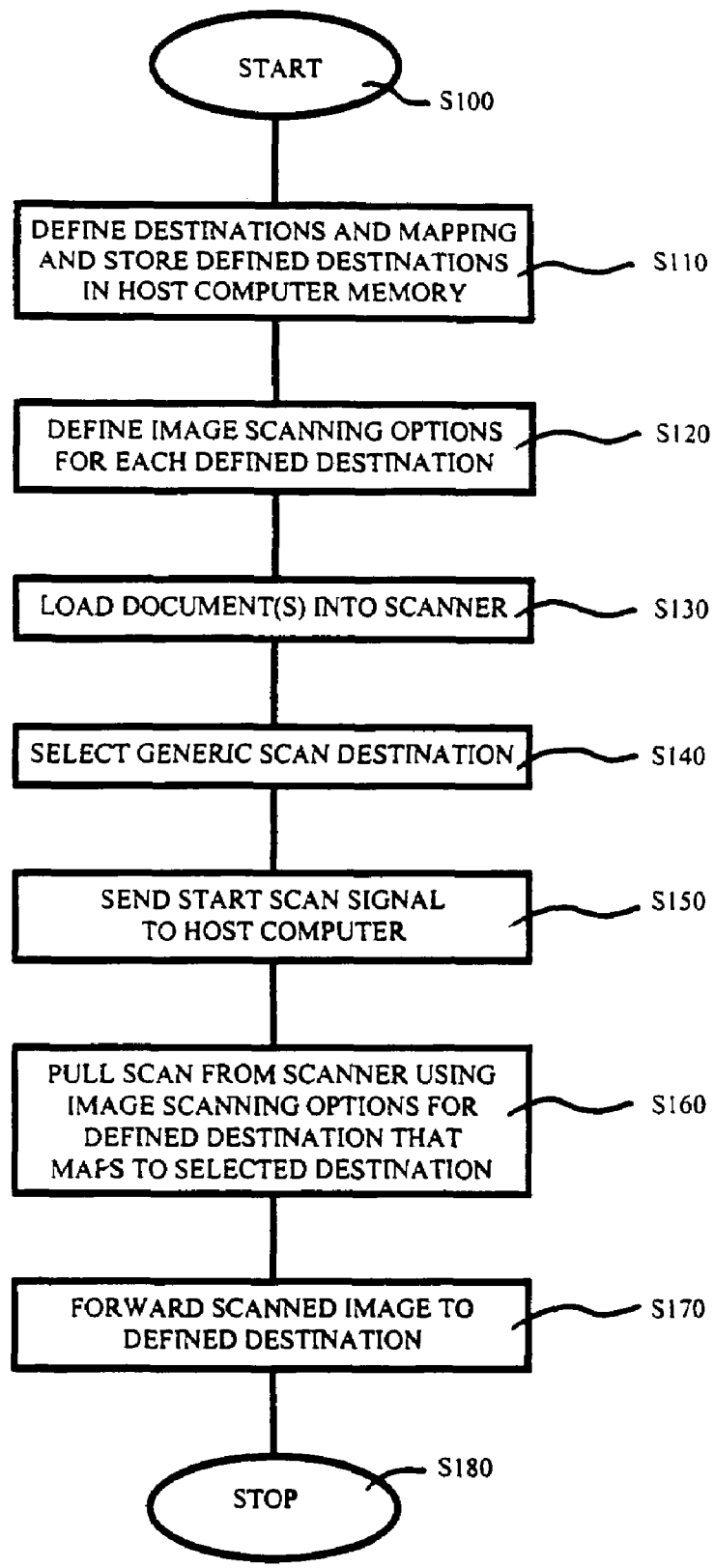
FIG. 4 is a flowchart outlining a first exemplary embodiment of a method for scanning according to this invention.

FIG. 4 is a flowchart outlining a first exemplary embodiment of a method for scanning according to this invention. Beginning in step S100, the method continues to step S110, where destinations and mappings between destination names and actual destinations are defined and stored in a memory of the host computer. Then, in step S120, the image scanning options or scanning parameters are defined for each defined actual destination. Next, in step S130, the user loads one or more documents into the scanner or multi-function device. Control then continues to step S140.

In step S140, the user selects a generically named destination using the user interface of the scanner or multi-function device. Next, in step S150, the user sends a start scan signal to the host computer. Then, in step S160, the host computer pulls a scan from the scanner using the image scanning options for the define destination that maps to the destination name selected by the user using the user interface of the scanner or multi-function device. Control then continues to step S170.

In step S170, the host computer processes and forwards the scanned image data to the actual destination. Then, in step S180, the method stops.

It should be appreciated that, while the first exemplary embodiment of the method for scanning according to this invention defines the destination mapping and the scanning options in step S110 and S120, it should be appreciated that, in general, steps S110 and S120 will be performed only infrequently, and may be performed only once. Thus, after steps S110 and S120 are performed initially, the methods according to this invention can omit steps S110 and S120 and begin immediately with step S130 while remaining within the spirit and scope of this invention.

Figure 5:
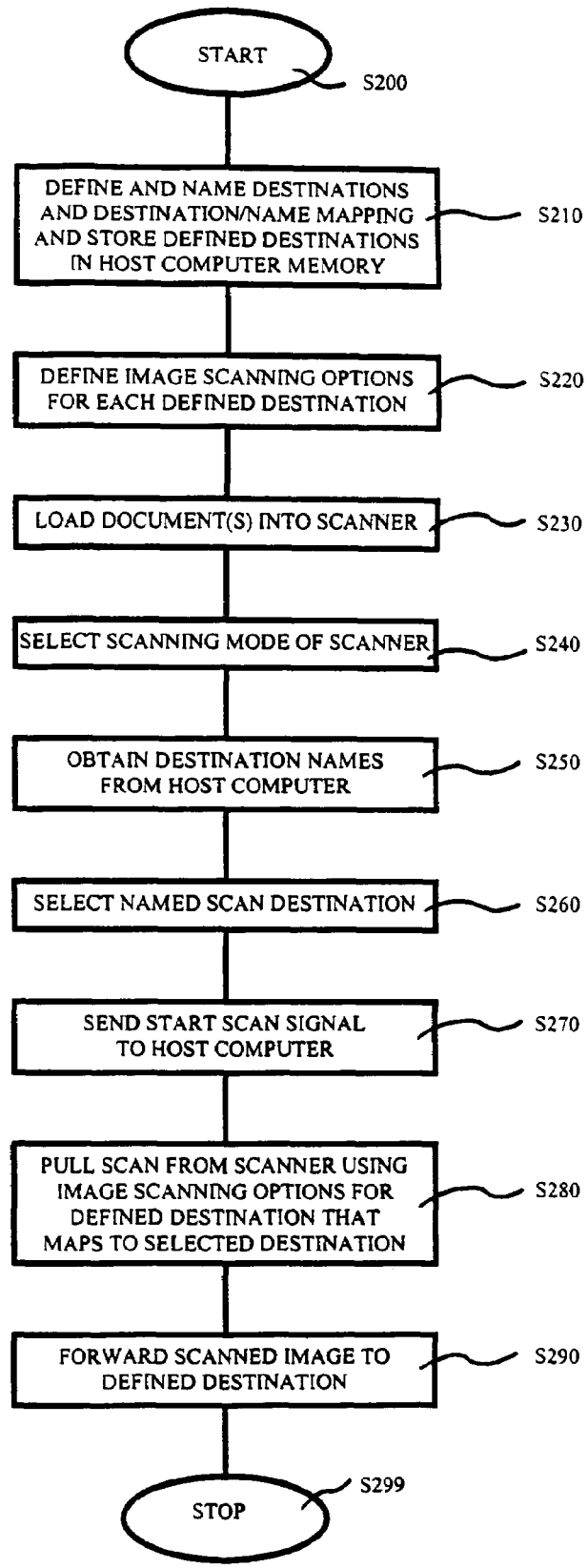
FIG. 5 is a flowchart outlining a second exemplary embodiment of a method for scanning according to this invention.

FIG. 5 is a flowchart outlining a second exemplary embodiment of a method for scanning according to this invention. In general, steps S210–S230 and steps S270–S290 of the second exemplary embodiment of the method for scanning shown in FIG. correspond to steps S110–130 and steps S150–S170. Thus, these steps will not further described. However, in contrast to the first exemplary embodiment of the method for scanning according to this invention, as shown in FIG. 4, in the second exemplary embodiment of the method for scanning shown in FIG. 5, after step S230, in step S240, the user selects a scanning mode of the scanner or multi-function device. Next, in step S250, the scanner or multi-function device obtains meaningful destination names from the host computer. Then, in step S260, the scanner or multi-function device displays the meaningful destination names so that the user can select a destination having a meaningful name, rather than a generic scan destination name that is otherwise meaningless to that particular user. Control then continues to step S270.

Figure 6:
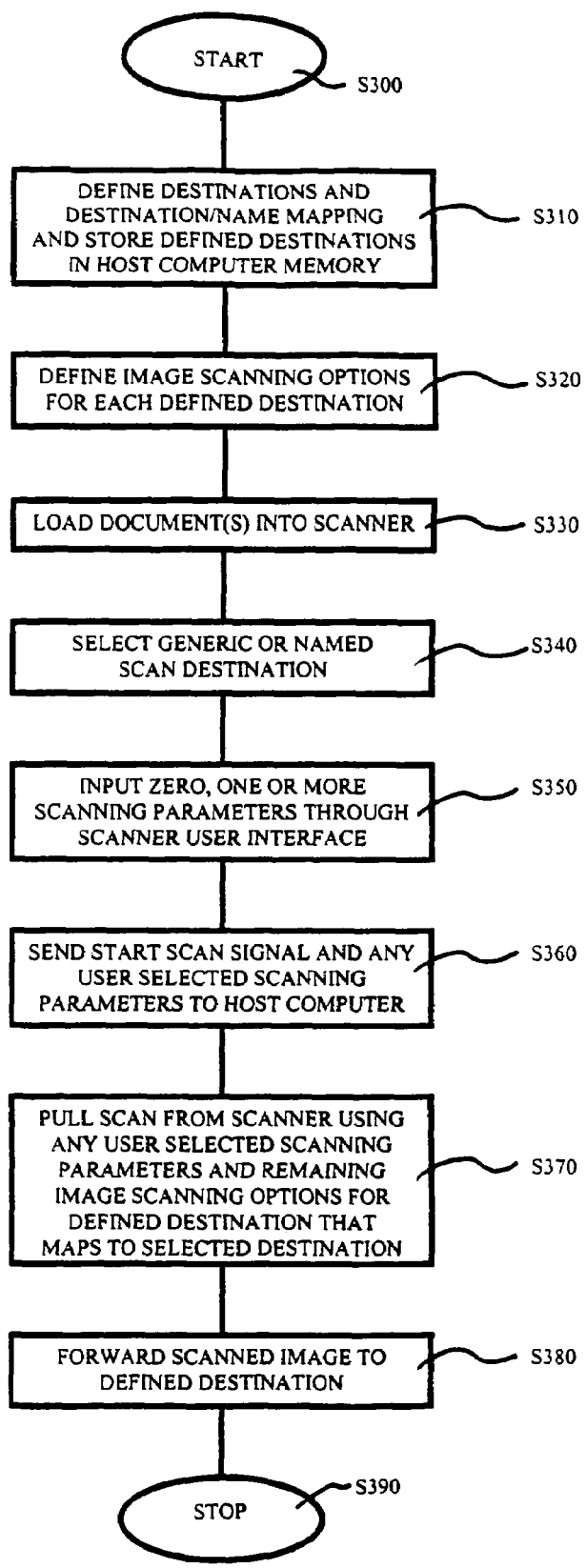
FIG. 6 is a flowchart outlining a third exemplary embodiment of a method for scanning according to this invention.

FIG. 6 is a flowchart outlining a third exemplary embodiment of a method for scanning according to this invention. In particular, steps S310–S340 of this third exemplary embodiment of the method for scanning according to this invention identical to steps S110–S140 of the first exemplary embodiment of the method for scanning according to this invention. However, in step S350, the user is allowed to input zero, one, or any number of scanning parameters through the scanner or multi-function device user interface. Then, in step S360, when the user sends the start scan signal to the host computer, the user-selected scanning parameters are also sent to the host computer along with the start scan signal. Next, in step S370, the scanned image data are pulled from the scanner using any user-selected scanning parameters and overriding the corresponding previously-defined scanning parameters. However, any remaining, un-overridden, scanning options or parameters that were previously defined for the selected destination are used to obtain and process the scanned image data. Control then continues to step S380.

In step S380, the obtained scanned image data are processed and forwarded to the actual destination that corresponds to the selected destination. Then, in step S380, the method stops.

Figure 7:
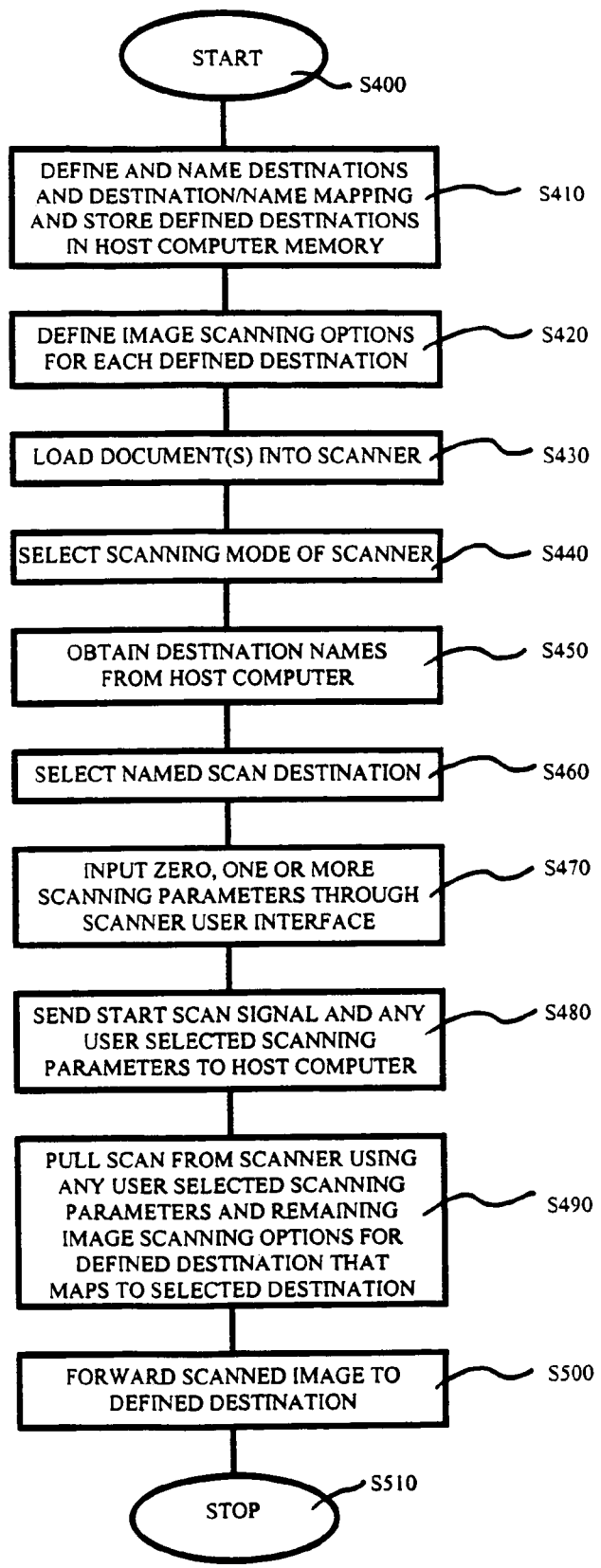
FIG. 7 is a flowchart outlining a fourth exemplary embodiment of a method for scanning according to this invention.

FIG. 7 shows a fourth exemplary embodiment of a method for scanning according to this invention. In particular, it should be appreciated that the fourth exemplary embodiment of the method for scanning according to this invention shown in FIG. 7 merely combines the second and third exemplary embodiments shown in FIGS. 5 and 6 into a single flowchart, such that both meaningful names are provided to the user and the user is allowed to select one or more scanning parameters that override the corresponding previously-defined scanning parameters. Thus, the fourth exemplary embodiment of the method for scanning to this invention and will not be described further.

It should be appreciated that the controllers 120 and 220 of the scanner or multi-function device 100 and the host computer 200, respectively, can be, in various exemplary embodiments, implemented using a system, manager or programmed general purpose computer. However, these controllers 120 and 220 and the various subportions of these controllers 120 and 220 described above and shown in FIGS. 1–3, can also be implemented on a special purpose computer, a system, manager or programmed microprocessor or microcontroller and peripheral integrated circuit elements, an ASIC or other integrated circuits, a digital signal processor, a hardwired electronic or logic circuit such as discrete element circuit, a system, manager or programmable logic device such as a PLD, PLA, FPGA or PAL, or the like. In general, any device, capable of implementing a finite state machine that is in turn capable of implementing the flowcharts shown in any one of FIGS. 4–7, can be used to variously implement the controllers 120 and 220 and /or the various sub-elements of these controllers 120 and 220 described above with respect to FIGS. 1–3.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A scanning system comprising:
a scanning device, comprising:
at least one input device usable to input data, and
a memory, the memory storing at least one destination indicator, wherein the at least one input device is usable to select one of the at least one destination indicator; and
a host device connectable to the scanning device, comprising:
a controller, comprising:
a scanned data manager that receives as input the selected destination indicator, the scanned data manager including:
a destination manager that determines the destination relating to the selected destination indicator, and
a scanned data processor that, based on at least one scan parameter corresponding to the determined destination, obtains the scanned data from the scanning device based on the determined destination and processes the scanned data, and
a memory, the memory storing:
at least one destination to which scanned data can be directed, the at least one destination corresponding to an identified memory location in the memory of the host device, and
data relating each of the at least one destination to one of the at least one destination indicator.

2. The scanning system of claim 1, wherein, in response to a user using the at least one input device to select one of the at least one destination indicator, the host device controls the scanning device to obtain scanned data based on the destination related to the selected destination indicator.

3. The scanning system of claim 2, wherein, in response to the user using the at least one input device to input a start signal, the scanning device outputs the start signal and the selected destination indicator to the host device.

4. The scanning system of claim 1, wherein:
the memory of the host device stores, for each destination, at least one scan parameter corresponding to that destination.

5. The scanning system of claim 4, wherein the at least one scan parameter comprises at least one of a type of destination, a scan resolution, at least one image correction parameter, a color space, a color depth, a facsimile transmission resolution, gamma, an original image type, and an original substrate type.

6. The scanning system of claim 5, wherein the type of destination is one of an application, a folder, a remotely located computer, a network node, a network path, and a memory drive.

7. The scanning system of claim 4, wherein the scanned data processor obtains the scanned data from the scanning device by generating control signals based on the at least one scan parameter and outputting the control signals to the scanning device.

8. The scanning system of claim 7, wherein the scanning device scans an original document based on the control signals to obtain the scanned data.

9. The scanning system of claim 7, wherein the scanned data processor stores the obtained scanned data from the scanning device in the memory of the host device and processes the stored scanned data based on the at least one scan parameter to generate processed scanned data.

10. The scanning system of claim 9, wherein the destination manager outputs the processed scanned data to the destination related to the selected destination indicator.

11. The scanning system of claim 1, wherein the memory of the host device stores, for each destination, a destination indicator that is able to meaningfully indicate that destination to a user of the scanning device.

12. The scanning system of claim 11, wherein, in response to the user using the at least one input device to input a signal indicating the user intends to scan a document, the host device outputs, for each destination in the memory, the corresponding destination indicator to the scanning device.

13. The scanning system of claim 12, wherein, in response to the host device outputting the destination indicators corresponding to the at least one destination, the scanning device stores the received destination indicators in the memory of the scanning device as the destination indicators of the scanning device and displays the destination indicators to the user.

14. The scanning system of claim 1, wherein, in response to a user using the at least one input device to select one of the at least one destination indicator and at least one input scan parameter, the host device controls the scanning device to obtain scanned data based on the destination related to the selected destination indicator and the at least one scan parameter.

15. The scanning system of claim 14, wherein, in response to the user using the at least one input device to input a start signal, the scanning device outputs the start signal, the at least one input scan parameter and the selected destination indicator to the host device.

16. The scanning system of claim 14, wherein: the memory of the host device stores, for each destination, at least one predefined scan parameter corresponding to that destination.

17. The scanning system of claim 16, wherein, when one of the at least one input scan parameter defines a value that is different from a value of a corresponding predefined scan parameter, the scanned data processor at least one of obtains the scanned data and processes the scanned data based on the input scan parameter.

18. The scanning system of claim 16, wherein the scanned data processor obtains the scanned data from the scanning device by generating control signals based on at least one of the at least one input scan parameter and the at least one predefined scan parameter and outputting the control signals to the scanning device.

19. The scanning system of claim 16, wherein the at least one input scan parameter comprises at least one of a scan resolution, at least one image correction parameter, a color space, a color depth, a facsimile transmission resolution, gamma, an original image type, and an original substrate type.

20. The scanning system of claim 1, wherein the scanning device is one of a scanner, a flatbed scanner, a facsimile machine, a multi-function device, and a digital copier.

21. The scanning system of claim 1, wherein the host device is one of a directly-connected computer, a remotely-located computer, a computer connected to the scanning device over a distributed network, and a node of a distributed network.

22. A scanner host device connectable to a scanning device, comprising:
a controller, comprising:
a scanned data manager that receives as input a selected destination indicator from the scanning device, the scanned data manager including:

a destination manager that determines the destination relating to the selected destination indicator, and a scanned data processor that, based on the-at least one scan parameter corresponding to the determined destination, obtains the scanned data from the scanning device based on the determined destination and processes the scanned data, and a memory, the memory storing:

at least one destination to which scanned data can be directed, the at least one destination corresponding to an identified memory location in the memory, and data, for each of the at least one destination, relating that destination to a destination indicator of the scanning device.

23. The scanner host device of claim 22, wherein, in response to the scanner host device receiving a destination indicator from the scanning device, the scanner host device controls the scanning device to obtain scanned data based on the destination related to the received destination indicator.

24. The scanner host device of claim 22, wherein:

the memory of the scanner host device stores, for each destination, at least one scan parameter corresponding to that destination.

25. The scanner host device of claim 24, wherein the at least one scan parameter comprises at least one of a type of destination, a scan resolution, at least one image correction parameter, a color space, a color depth, a facsimile transmission resolution, gamma, an original image type, and an original substrate type.

26. The scanner host device of claim 25, wherein the type of destination is one of an application, a folder, a remotely located computer, a network node, a network path, and a memory drive.

27. The scanner host device of claim 24, wherein the scanned data processor generates control signals based on the at least one scan parameter and outputs the control signals to the scanning device.

28. The scanner host device of claim 27, wherein the scanned data processor stores scanned data obtained from the scanning device in the memory of the scanner host device and processes the stored scanned data based on the at least one scan parameter to generate processed scanned data.

29. The scanner host device of claim 28, wherein the destination manager outputs the processed scanned data to the destination related to the received destination indicator.

30. A method for scanning a document using a scanner scanning device and a host device, the scanning device having a memory storing at least one destination indicator and the host device having a memory storing at least one destination to which scanned data can be directed and data relating each of the at least one destination to one of the at least one destination indicator, the method comprising:

selecting one of the at least one destination indicator at the scanning device;

transmitting the selected destination indicator to the host device;

determining at the host device a destination corresponding to the selected destination indicator, the destination corresponding to an identified memory location in the memory of the host device; and controlling the scanning device based on the determined destination, the controlling comprising obtaining scanned data from the scanning device based on at least one scan parameter corresponding to the determined destination.

31. The method of claim 30, wherein:

transmitting the selected destination indicator to the host device comprises:

inputting a start indication from a user, and outputting, in response to the start indication, a start signal and the selected destination indicator to the host device; and determining the destination comprises determining the destination in response to the start signal and the selected destination indicator.

32. The method of claim 30, further comprising:

storing in the memory of the host device-stores, for each destination, at least one scan parameter corresponding to that destination; and controlling the scanning device based on the determined destination further comprises:

processing the obtained scanned data based on at least one of the at least one scan parameter corresponding to the determined destination.

33. The method of claim 32, wherein the at least one scan parameter comprises at least one of a type of destination, a scan resolution, at least one image correction parameter, a color space, a color depth, a facsimile transmission resolution, gamma, an original image type, and an original substrate type.

34. The method of claim 33, wherein the type of destination is one of an application, a folder, a remotely located computer, a network node, a network path, and a memory drive.

35. The method of claim 32, wherein obtaining the scanned data from the scanning device comprises:

generating control signals based on the at least one of the at least one scan parameter; and outputting the control signals to the scanning device.

36. The method of claim 35, wherein obtaining the scanned data from the scanning device further comprises scanning an original document based on the control signals to obtain the scanned data.

37. The method of claim 32, further comprising outputting the scanned data to the destination related to the selected destination indicator.

38. The method of claim 30, further comprising:

inputting a scan indication from the user indicating the user intends to scan a document;

outputting a first signal to the host device;

outputting from the host device to the scanning device, in response to the first signal, for each destination stored in the memory of the host device, a destination indicator that is able to meaningfully indicate that destination to a user of the scanning device.

39. The method of claim 38, further comprising:

storing the received destination indicators in the memory of the scanning device as the destination indicators of the scanning device; and displaying the destination indicators to the user.

40. The method of claim 30, further comprising:

selecting at least one input scan parameter;

transmitting the selected at least one input scan parameter with the selected destination indicator; and controlling the scanning device based on the at least one input scan parameter along with the determined destination.

41. The method of claim 40, further comprising:

storing in the memory of the host device~, for each destination, at least one predefined scan parameter corresponding to that destination; and controlling the scanning device based on the at least one scan parameter along with the determined destination further comprises controlling the scanning device based on at least one of the at least one input scan parameter and the at least one predefined scan parameter corresponding to the determined destination along with the determined destination.

42. The method of claim 41, wherein controlling the scanning device based on the at least one scan parameter along with the determined destination further comprises controlling the scanning device based on at least one of the at least one input scan parameter and the at least one predefined scan parameter corresponding to the determined destination along with the determined destination comprises:

determining, for each of the at least one input scan parameter, whether that input scan parameter corresponds to a predefined scan parameter;

replacing the corresponding predefined scan parameter with that input scan parameter when that input scan parameter corresponds to a predefined scan parameter;

adding that input scan parameter to the at least one predefined scan parameter when that input scan parameter does not correspond to a predefined scan parameter; and controlling the scanning device based on the at least one predefined scan parameter corresponding to the determined destination along with the determined destination.

43. The method of claim 40, wherein the at least one input scan parameter comprises at least one of a scan resolution, at least one image correction parameter, a color space, a color depth, a facsimile transmission resolution, gamma, an original image type, and an original substrate type.

44. The method of claim 30, wherein the scanning device is one of a scanner, a flatbed scanner, a facsimile machine, a multi-function device, and a digital copier.

45. The method of claim 30, wherein the host device is one of a directly-connected computer, a remotely-located computer, a computer connected to the scanning device over a distributed network, and a node of a distributed network.

* * * * *